Oct. 30, 1962 J. E. WOLBER 3,060,728
METHOD AND APPARATUS FOR MEASURING CORROSION
OF STRESSED MATERIALS
Filed June 22, 1959 2 Sheets-Sheet 1

INVENTOR.
JAMES E. WOLBER
BY Edward H. Lang
ATTORNEY

INVENTOR.
JAMES E. WOLBER
BY Edward H. Lang
ATTORNEY

United States Patent Office 3,060,728
Patented Oct. 30, 1962

3,060,728
METHOD AND APPARATUS FOR MEASURING CORROSION OF STRESSED MATERIALS
James E. Wolber, Roselle, Ill., assignor to The Pure Oil Company, Chicago, Ill., a corporation of Ohio
Filed June 22, 1959, Ser. No. 822,095
19 Claims. (Cl. 73—86)

This invention relates to a method and apparatus for measuring the extent of corrosion of a test specimen which is subjected to mechanical strain. It is more specifically concerned with a corrosion test probe adapted to apply mechanical strain to a corrodible test element, and to permit accurate measurement of both the magnitude of the applied strain and the extent of corrosion of the test element by means of a single electrical measuring circuit.

In solving or observing specific plant corrosion problems, corrosion tests carried out in the operating equipment provide the most reliable and consistent results. By observing the influence of corrosion under actual service conditions, the heterogeneousness of the corrosive environment is taken into consideration. The prior art teaches the use of various test probes and associated apparatus for measuring corrosion rates under service conditions. A corrodible test specimen, preferably fabricated from the same material as the equipment under study, is exposed to the corrosive atmosphere. The extent of corrosion of the test specimen is determined from time to time. From the rate of corrosion of the test specimen, the rate of corrosion of the operating equipment under study may be estimated.

The results obtained from such tests are sometimes unsatisfactory because the actual equipment under study is subjected to mechanical stress and strain. The rate of corrosion of a stressed structure differs from the rate of corrosion of the same structure when it is not subjected to stress. The rate of corrosion of metals subjected to tensile stress is generally substantially greater than the rate of corrosion of the unstressed metal. The rate of corrosion generally varies in proportion to the magnitude of the applied stress. It is therefore very difficult to deduce accurately the rate of corrosion of equipment under study when that equipment is subject to mechanical stress, unless the test specimens used in the corrosion study are subjected to a stress of similar magnitude during the period in which they are exposed to the corrosive environment.

It is an object of this invention to provide a corrosion test probe capable of applying mechanical stress to a test element and supporting this test element in exposure to a corrosive environment under study.

It is a further object of this invention to provide a corrosion test probe and cooperating electrical apparatus by which a corrosion test element may be subjected to mechanical stress of a desired magnitude, and the magnitude of the applied strain and the extent of corrosion of the test element measured electrically.

It is a further object of this invention to provide a corrosion test probe and auxiliary electrical circuits by which the magnitude of the stress applied to the test element and the rate of corrosion of the test element can be measured electrically; and by which automatic compensation is made for errors which would otherwise be introduced by fluctuations in the temperature of the environment under study during the duration of the corrosion test.

These and other objects of this invention will become apparent in the detailed description of the invention. In brief, this invention is directed to a corrosion-sensing probe intended to be used in conjunction with a Wheatstone bridge measuring circuit, and to a method for measuring the stress applied to a corrosion test specimen and the rate of corrosion of this stressed specimen when exposed to the environment under study. The probe supports two foil-like metallic test elements, at least one of which is exposed to the corrosive atmosphere. The exposed element can be subjected to any desired stress within its elastic limit, and the magnitude of the applied stress can be determined by measuring the change in the ratio of the resistances of the two elements. The element-supporting test probe includes means for applying the desired mechanical stress to the test element.

When tensile stress is applied to an elastic material, that material is deformed or strained in proportion to the magnitude of the applied stress, according to Hooke's law. When tensile stress is applied to an electrically conductive material, the resistance of the material increases in proportion to the applied stress. Elongation and volumetric deformation (strain) of the specimen and reduction in its cross-sectional area caused by the applied stress account for at least a large part of the resistance change. Other factors are involved, and the percentage resistance change produced by a given unit stress or strain will not necessarily be the same for different materials, or even for different grades of steel. Since the relationship between applied stress and resistance change may be determined experimentally for any material, and since the change in resistance expressed as a function of applied stress or strain is linear, it is possible to determine quantitatively the magnitude of an applied stress or strain by measurement of the change of the resistance of the stressed element.

Changes in temperature of a conductive material also produce changes in resistance. The method of measuring stress by change in electrical resistance is therefore subject to error if the temperature of the stressed, conductive material changes during the period of study. In order to eliminate the error which might otherwise be introduced by fluctuations in temperature, it is desirable to expose two specimens of the same conductive material to the same conditions of temperature, and measure the ratio of resistances of the two specimens. Fluctuations in temperature will proportionally change the resistance of each speciment, and the ratio of the resistances of the specimens will therefore remain constant during the temperature fluctuations. If one of the specimens is subjected to stress, the resistance of that specimen will increase in proportion to the stress. The ratio of the resistances of the stressed and unstressed specimens will also change in proportion to the magnitude of the applied stress.

When an electrically conductive, corrodible specimen is subjected to a corrosive atmosphere, the corrosion process removes metal from the specimen and the cross-sectional area of the specimen is thereby decreased. The electrical resistance of the specimen is proportionately increased. It is therefore possible to measure the extent of corrosion of a test specimen by measuring the change in resistance of the specimen over the period during which it corrodes. This method of measuring the extent of corrosion is also subject to errors, which may be introduced by a change in the resistance of the specimen caused by temperature fluctuations. This error may be automatically eliminated by measuring the ratio of the resistances of a corroding test specimen and a specimen fabricated from the same material of construction which is exposed to the same condition of temperature fluctuation, but is protected from the corrosive influence of the environment to which the specimens are exposed.

According to this invention, two corrodible, electrically conductive test elements are subjected to the conditions of temperature existing in the environment under study. At least one of the elements is also subject to the corrosive influence of the environment. The other element may be protected from the corrosive effects by coating it with a suitable corrosion-inhibiting material. If mechanical stress is applied to the unprotected test element, the ratio of the resistances of the test element and the protected or compensating element will change in proportion to the magnitude of the applied stress. By measuring the change in this ratio of resistances, it is possible to measure accurately the magnitude of the applied stress, the errors which might otherwise be introduced by fluctuations in temperature being automatically eliminated.

After the desired stress has been applied to the test element, as measured by the change in the ratios of the resistances of the two elements, the test element and compensating element may be permitted to remain in exposure to the corrosive influences of the environment under study. As the test element corrodes, the ratio of the resistance of the test element to the resistance of the compensating element increases, and this increase in the ratio of resistances is proportional to the extent of the corrosion of the test element. By measuring the second change in the ratio of the resistances, it is possible to determine the extent of corrosion of the test element.

Alternatively, both the test element and compensating element may be exposed to the corrosive influences of the environment under study. In this case neither element is coated with a corrosion-inhibiting material. Only the test element is subjected to stress, and the magnitude of the stress is measured as previously described. With the passage of time, both elements will become corroded, but the stressed test element will corrode at a more rapid rate. The resistances of both elements will increase as they corrode, but the increase in the resistance of the stressed element will be more rapid because of the more rapid corrosion of this element. The change in the ratios of the resistances of the test element and compensating element will, in this case, represent the increase in the extent of corrosion produced by the applied stress. In this way it is possible to measure the influence of a stress of any given magnitude upon the corrosion rate of a corrodible, electrically conductive material.

Referring to the drawings.

Figure 1:
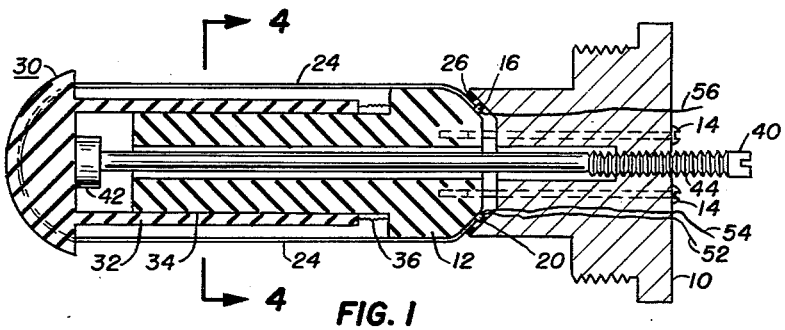
FIGURE 1 is a cross-sectional view of the test probe of this invention.
Figure 3:
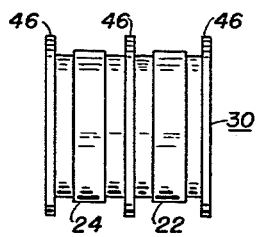
FIGURES 2 and 3 are, respectively, right and left-side views of the probe depicted in FIGURE 1.
Figure 2:
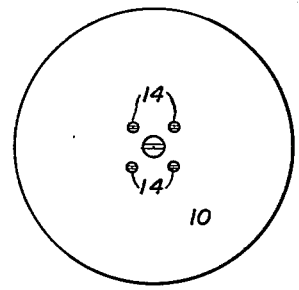
Figure 4:
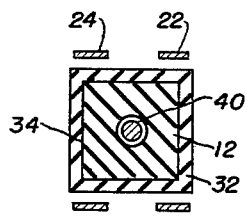
FIGURE 4 is a sectional view in the plane 4—4 of FIGURE 1.
Figure 5:
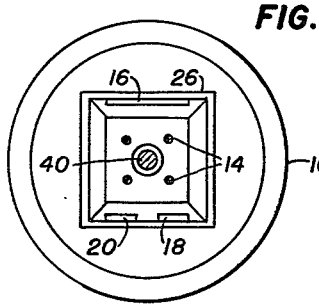
FIGURE 5 is a left-side view of the base of the test probe depicted in FIGURE 1.

Referring to FIGURES 1 to 5, cylindrical base 10 is threaded for insertion in a standard pipe or pressure-vessel fitting. Body member 12, which is made from an electrically insulating material, is held in place adjacent to base member 10 by four bolts 14. Electrical contacts 16, 18, and 20 are supported by base 10 in insulated relationship therewith, and test element 22 and compensating element 24 are held in place between the electrical contacts and body member 12 when bolts 14 are turned tight. Rubber gasket 26 is also supported by the base and is compressed by the body member to form a seal between the body member and the base. End member 30, made of electrically insulated material, has a hollow portion 32 which fits over portion 34 of the body member. A close-sliding fit is preferred. Elastic filament or bellows 36 forms an expandable seal between body member 12 and end member 30. The sliding surfaces of the body member and end member may be square in cross-section, as shown in FIGURE 4, or may be round, in which case a key and keyway, or similar means must be provided to permit axial movement of the members relative to each other, but to prevent rotation of the end member relative to the body member. Threaded rod 40, which extend through the test probe, includes a flanged portion 42 and threaded portion 44. Flange 42 butts against the inside surface of end member 30, and threaded portion 44 mates with a corresponding thread in base 10.

The unsupported length of threaded rod 40, that is, the length from the internal terminal point of the mating thread in base 10 to the point of contact between flanged portion 42 and end member 30, should be equal to ½ of the free length of the test element. If the threaded rod and the test element have the same thermal coefficient of expansion, changes in temperature will not then vary the strain applied to the test element, since both the test element and rod 40 will expand and contract proportionately. End member 30 is equipped with three ribs 46, which separate the test element and compensating element.

Figure 6:
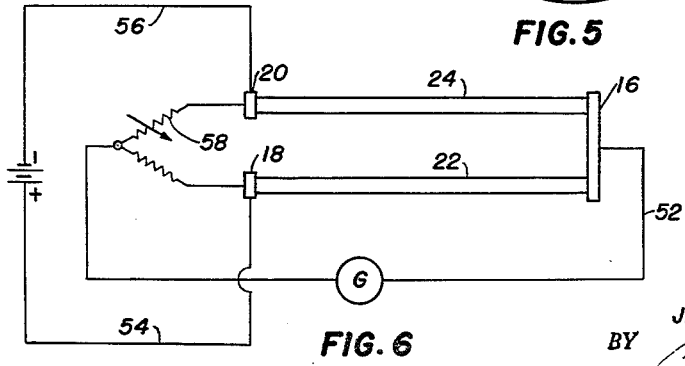
FIGURE 6 is a schematic diagram of an electrical circuit which may be used with the test probe of this invention.

In operation, the probe is screwed into a threaded opening in a pipe or pressure vessel, and the Wheatstone bridge circuit of FIGURE 6 is connected to the three electrical conductors 52, 54, and 56, which connect respectively to electrical contacts 16, 18, and 20. The bridge circuit is then balanced by means of potentiometer 58 and stress is applied to the test element by rotating threaded rod 40. It is apparent that if the test element and compensating element are inserted in the probe so that the free length of the compensating element is slightly greater than that of the test element, say 1/16 of an inch greater, as the probe is extended by the rotation of rod 40, only the test element will be stressed. Since stress is applied to test element 22, but not to compensating element 24, the bridge will become unbalanced, and the magnitude of this unbalance will be proportional to the applied stress.

Suitable calibration will be required if it is desired to determine the applied stress or strain in standard engineering units. It may be more convenient to decide how much stress is to be applied, and calculate the resistance change which will correspond to this stress. Potentiometer 58 may then be adjusted for this resistance change, and the probe may be elongated by the rotation of threaded rod 40 until the bridge is restored to a balanced condition.

After the desired stress has been applied to the test element, the bridge is restored to a balanced condition and corrosion measurements can thereafter be taken. If the compensating element is coated with a corrosion-insulated material, the probe will measure the extent of corrosion of the stressed test element. Alternatively, both the test element and compensating element may be uncoated, in which case the probe will measure the increased corrosion caused by the applied stress. The removal of metal from the stressed test element will produce an irregular stress pattern therein which may differ materially from the initial test conditions. Since this also happens when a structure corrodes, the data obtained from the tests will correspond realistically with the corrosion conditions which actually prevail in practice.

The test element and compensating element are preferably fabricated from the same material, and in any event must have similar temperature-resistance characteristics. The elements may be in the form of small-diameter wires, but are preferably thin, foil-like strips, having a thickness of about 0.001 inch, a width of about 0.250 inch, and a length of about 6 inches. Elements having other dimension may be used. A stress of about 30,000 p.s.i. in a steel test element may be expected to produce a strain of about 0.001 inch per inch and a resistance change of about 0.2%. This value will vary from one steel to another, and it will therefore be necessary to calibrate test elements fabricated from any given steel. This calibration is conveniently made by inserting a test element in the corrosion probe and securing a standard electric strain gauge, such as the commercially available SR–4 strain gauge, to the test element. The SR–4 strain gauge will be connected with the commercially available circuit intended for use therewith. Rod 40 will be rotated to apply stress to the test element, and the magnitude of this stress is measured using the SR–4 strain gauge and circuit. The corresponding unbalance produced in the corrosion-measuring bridge circuit is noted. A curve relating applied stress and bridge circuit unbalance may conveniently be obtained. This curve will be valid for all test elements which are fabricated from the same steel. Stresses ranging from about 10,000 to 100,000 p.s.i. may be used in corrosion studies, depending upon the nature of structure under investigation, and the probable stresses existing in the structure.

It must be understood that the accuracy of the results obtained using the test probe and method of this invention is dependent upon the accuracy and sensitivity of the resistance ratio measuring circuit employed. Wheatstone bridge circuits, equipped with sensitive galvanometers, are suitable for this purpose. Other accurate resistance ratio measuring devices, such as those disclosed by Ellison in U.S. Patents Nos. 2,824,283 and 2,830,265, may advantageously be used with the test probe of this invention. The test element and compensating element may be fabricated in accordance with the directions obtained in the aforenamed patents. The compensating element may be coated with an epoxy resin such as Armstrong adhesive A–2.

Figure 7:
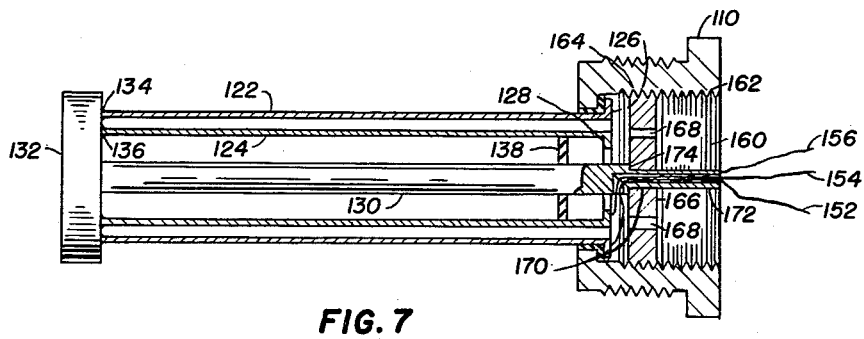
FIGURE 7 is a sectional view of an alternate structure for the test probe of this invention.

An alternate test probe structure is shown in FIGURE 7. Base 110 is threaded for insertion in a standard pipe or pressure vessel fitting. Test element 122 and compensating element 124 are fabricated from thin-wall circular tubing. Test element 122 preferably has an outwardly depending flange 126, and compensating element 124 has an inwardly depending flange 128. Test element 122 is supported adjacent to the flanged end by base 110, and projects therefrom. Thrust rod 130 has a flanged portion 132 to which test elements 122 and 124 are secured, as by welding, at points 134 and 136, respectively. Compensating element 124 is disposed concentrically within test element 122, and is supported by flange 132 and by electrically insulating washer 138. Electrical conductor 152 is connected to the outwardly depending flange 126 of test element 122. Conductor 154 is connected to the inwardly depending flange 128 of compensating element 124. Conductor 156 is connected to electrically conducting thrust rod 130 and thus is electrically connected to the two other ends of test elements 122 and compensating element 124. These three conductors pass through the base portion of the probe to a point at which they are accessible for connection to an electrical resistance-measuring circuit, such as is shown in FIGURE 6. Base member 110 has a hollow internal cavity 160, which contains an internally threaded surface 162, so that rotation of washer 166 produces an axial movement thereof with respect to base 110. Washer 166 is equipped with two spaced holes, 168, to accommodate a spanner wrench. Washer 166 has a central circular hole 170, which slidably and rotatably engages surface 172 of thrust rod 130. Surface 172 is cylindrical and has a diameter substantially less than that of the remainder of the rod. Shoulder 174 is located at the junction of surface 172 with the larger diameter portion of thrust rod 130. Washer 166, when rotated to produce an inward axial movement thereof, bears against shoulder 174 and imparts an axial thrust to thrust rod 130. This thrust is in turn applied to test element 122 to produce an axial strain of the test element. Outwardly depending flange 126 serves to retain test element 122 in base 110, and also produces a large-area electrical connection to thin-wall test element 122. Inwardly depending flange 126 of test element 124 serves to afford a large-area electrical connection to thin-wall compensating element 124. These flanges thus serve to produce a more uniform current density in the test element and compensating element. Test element 122 may be stressed to any desired extent within its elastic limit by rotating washer 166 until it bears against shoulder 174 of thrust rod 130, and applies axial thrust thereto. As compensating element 124 is protected within test element 122, with which it is concentric it is not necessary to coat the compensating element to prevent the corrosion thereof.

Figure 8:
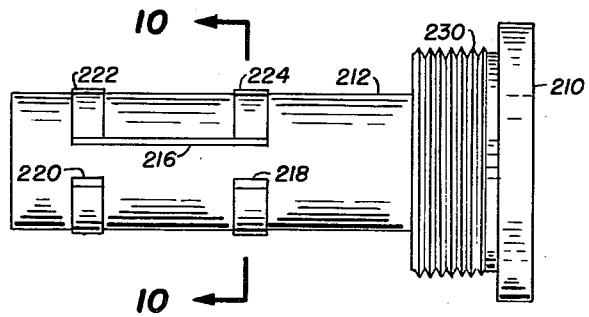
FIGURE 8 shows a second alternate structure for the test probe of this invention.
Figure 9:
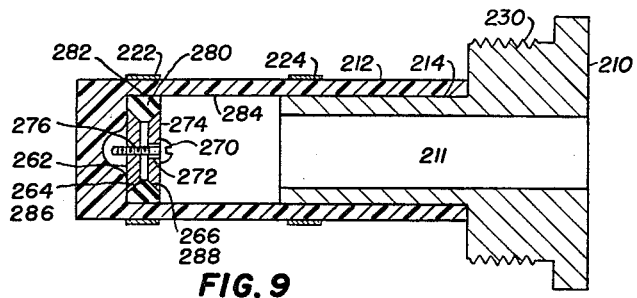
FIGURE 9 is a sectional view of the test probe depicted in FIGURE 8.
Figure 10:
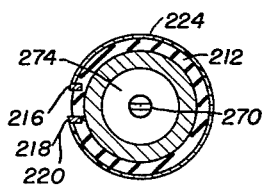
FIGURE 10 is a view in the plane 10—10 of the test probe depicted in FIGURE 8.

FIGURES 8 to 10 depict a second alternate test probe structure in which the test element and compensating element are disposed circumferentially around a cylindrical support. Base 210 is threaded for insertion in a standard pipe or pressure-vessel fitting. Support member 212 surrounds and is supported by a cylindrical portion 214 of base 210. Cylindrical portion 214 has a diameter substantially less than that of thread 230 of base 210. Thus, the whole probe may be inserted through the threaded opening of a pipe or pressure vessel. Support member 212 is preferably fabricated of a resilient, electrically insulating plastic. Electrical contacts 216, 218, 220 are secured to support member 212, and are preferably molded in place in the support member so that only the outer surface of the contacts is exposed. Electrical conductors (not shown) are connected respectively to the contacts. These conductors pass through opening 211 in base 210, and extend to a point at which they may be conveniently connected to a resistance-measuring circuit.

Test element 222 and compensating element 224 extend circumferentially around support member 212. The terminal ends of the test element and compensating element are connected, as by silver soldering, to contacts 216, 218, and 220. The test element and compensating element are, however, preferably fabricated in place by spray-plating a thin film of metal circumferentially around the support member. Alternatively, foil-like test elements and compensating elements may be molded in place in the same operation in which plastic support member 212 is formed. Support member 212 is hollow and cup-shaped. The open end of the support member fits over and derives support from cylindrical portion 214 of base member 210. Opening 211 in base 210 provides access to the interior of support member 212, in which is disposed means 262 for radially expanding the resilient support member to produce the desired stress in circumferentially disposed test element 222. If the test element or compensating element are very long, they may be wrapped any desired number of times around the circumference of the support member. Only the terminal ends of the test element and compensating element are connected electrically to the contacts.

Means 262 comprises two right cylindrical truncated cones 264 and 266. Machine screw 270 passes through a central axial hole 272 in truncated cone 266. The head of the screw bears against surface 274 of truncated cone 266. Machine screw 270 engages internally-threaded, central axial hole 276 in truncated cone 264. Rotation of machine screw 270 compels axial movement of the two truncated cones toward each other. The truncated cones are disposed with their smaller bases adjacent to each other. Resilient washer 280 has a cylindrical exterior surface 282, which engages the interior surface 284 of support member 212. Interior surfaces 286 and 288 of washer 280 are conically shaped to accommodate and engage the peripheries of truncated cones 264 and 266. Thus, axial movement of the two cone members toward each other, compelled by rotation of machine screw 270, expands resilient waser 280. Washer 280 bears against surface 284 of the interior of the support member, forces expansion of the support member and thereby applies mechanical stress to test element 222. The magnitude of the stress and the rate of corrosion of the test element are measured as before explained.

What is claimed is:

1. A process for determining the magnitude of mechanical stress applied to a test element and for determining the extent of corrosion of said test element when subject to said mechanical stress comprising, applying stress to a test element, measuring the change in the ratio of the resistance of said test element to the resistance of a compensating element to which substantially no stress is applied, said change in ratio of resistances occurring when stress is applied to said test element, exposing said test element while in a stressed condition to a corrosive environment, and again measuring the change in the ratios of the resistances of said test and compensating elements, said second change in ratio of resistances occurring while said test element corrodes.

2. A method according to claim 1 in which said test and compensating elements are at substantially the same temperature when said measurements are made.

3. A method according to claim 2 in which the ratio of the resistances of said test and compensating elements is measured before stress is applied to said test element, said ratio is again measured after stress is applied to said test element, but before said test element is corroded, and said ratio is again measured after said test element has become corroded.

4. A method according to claim 2 in which said test element is subjected to a tensile stress of about 10,000 to 100,000 lbs. per square inch.

5. An apparatus for measuring the corrosion of a mechanically stressed, electrically conductive test element in a corrosive environment comprising, probe means including an electrically conductive test element, a compensating element having a temperature-resistance characteristic similar to that of said test element, means for supporting said elements for exposure to the conditions of temperature existing in said environment, at least said test element being supported for exposure to the corrosive effects of said environment, means for applying a substantial mechanical stress to said test element, and electrical means electrically connected to the terminal ends of said elements for measuring the ratio of the resistances of said elements.

6. An apparatus according to claim 5 in which said elements have a ratio of length to cross-section in excess of 100 inches per square inch.

7. A corrosion probe for measuring the corrosion of a mechanically stressed, electrically conductive test element comprising, a base adapted to be mounted for projecting the probe into a corrosive environment, an electrically conductive test element, a compensating element having a temperature-resistance characteristic similar to that of said test element, said elements being operably supported by said base for exposure to the conditions of temperature existing in said environment, at least said test element being supported for exposure to the corrosive influence of said environment, means for applying mechanical strain to said test element, and three electrical conductors extending through said base in insulated relationship therewith, said first electrical conductor being connected to one terminal end of each of said elements, and the second and third conductors being connected respectively to the other terminal ends of said test and compensating elements.

8. An apparatus according to claim 7 in which said elements have a ratio of length to cross-section exceeding 100 inches per square inch.

9. An apparatus according to claim 8 in which said elements are foil-like metallic ribbons.

10. An apparatus according to claim 8 in which said elements are thin-wall, tubular specimens.

11. An apparatus according to claim 8 in which said means for applying mechanical stress to said test element includes a rotatable shaft threaded to engage mating threads in said base, and stress is applied to said test element by rotating said threaded shaft.

12. A corrosion probe for measuring corrosion of a mechanically stressed, electrically conductive test element comprising, a base adapted to be mounted for projecting a test element support member into a corrosive environment, a cup-shaped test element support member attached at its open end to said base member, said cup-shaped support member being fabricated from a resilient material, an electrically conductive test element, a compensating element having a temperature-resistance characteristic similar to that of said first test element, said elements being disposed circumferentially around said cup-shaped support member and supported thereby, said elements being spaced axially from each other along said cup-shaped member, means disposed within said cup-shaped member for forcing radial expansion thereof to stress said test element, and three electrical conductors extending through said base in insulated relation therewith, said first electrical conductor being connected to one terminal end of each of said elements, and the second and third conductors being connected respectively to the other terminal ends of said test and compensating elements.

13. An apparatus according to claim 12 wherein said last-named means comprises, an expansible ring-shaped member, two truncated cone members disposed within said ring-shaped member in supporting contact therewith, a shaft passing axially through said ring-shaped member and said cone members, said shaft having threads engaging a mating thread in at least one of said cone members, said shaft engaging said other cone member to compel axial movement thereof with respect to said first cone member as said shaft is rotated, said cone members being disposed with bases of corresponding diameter adjacent to each other, said cones engaging said ring-shaped member to produce radial expansion thereof as said shaft is rotated.

14. An apparatus according to claim 12 in which said cup-shaped member is composed of a resilient, electrically nonconductive material and said elements comprise thin metallic foils bonded to said cup-shaped member.

15. A corrosion probe for measuring the corrosion of a mechanically stressed, electrically conductive test element comprising, a base adapted to be mounted for projecting said test element into a corrosive environment, a tubular electrically conductive test element rigidly supported at one end by said base member, an electrically conductive plate secured to the open, unsupported end of said test element to form a closure therefor, a compensating element having a temperature-resistance characteristic similar to that of said test element disposed within said test element in spaced relation therewith, said compensating element being fastened at one end to said plate member and supported therefrom, a shaft-member disposed within said test element engaging said plate member, and means cooperating with said base and said shaft member to compel axial movement of said shaft member relative to said base member to apply mechanical stress to said test element, and three electrical conductors extending through said base in insulated relationship therewith, said first electrical conductor being operably connected to one terminal end of each of said elements, and the second and third conductors being respectively connected to the other terminal ends of said test and compensating elements.

16. An apparatus according to claim 15 in which said first test element is supported by said base in electrically insulated relationship therewith.

17. An apparatus according to claim 16 in which said last-named means comprises, an externally threaded washer engaging a mating, internal thread in said base, said washer also engaging said shaft member to compel axial movement thereof as said washer is rotated relative to said base.

18. A corrosion probe for measuring the corrosion of a mechanically stressed, electrically conductive test element comprising, a base adapted to be mounted for projecting a test element support member into a corrosive environment, a test element support member comprising a body member and an end member, said end member being slidably supported by said body member and providing a closure therefor, said body member containing an axial aperture to accommodate a shaft, a shaft extending axially through said aperture to engage said end member and said base, means for securing the body member tightly against said base, a plurality of electrical contacts disposed between said body member and said base, said contacts cooperating with said body member and said base to provide a clamp to grip firmly the terminal ends of test elements disposed between said body member and said base, and provide electrical connection to said test elements, when said base and said body member are secured against each other, said shaft having a threaded portion mating with a corresponding thread in said base to compel axial movement of said shaft relative to said base as said shaft is rotated, whereby said slidably supported end member is moved to apply mechanical stress to a gripped test element, and three electrical conductors extending through said base in insulated relationship therewith, said first electrical conductor being connected to an electrical contact adapted to connect to one terminal end of each of said elements, and the second and third conductors being connected respectively to the second and third electrical contacts adapted to connect respectively to the other terminal ends of said elements.

19. A probe for measuring the corrosion of a mechanically-stressed, electrically-conductive test element in a corrosive environment, comprising an electrically-conductive test element, a compensating element having a temperature-resistance characteristic similar to that of said test element, means for supporting said elements for exposure to the conditions of temperature existing in said environment, said test element being supported for exposure to the corrosive effects of said environment, and means for applying mechanical stress to said test element.

References Cited in the file of this patent
UNITED STATES PATENTS

| | | |
|---|---|---|
| 2,735,754 | Dravnieks | Feb. 21, 1956 |
| 2,824,283 | Ellison | Feb. 18, 1958 |
| 2,834,858 | Schaschl | May 13, 1958 |
| 2,851,570 | Schaschl | Sept. 9, 1958 |
| 2,878,354 | Ellison | Mar. 17, 1959 |

OTHER REFERENCES

"Technical Publication No. 691," by Schroeder et al., published in Metals Technology, January 1936. Pages 1–3 relied on. Copy in Div. 36 73–86.

"Properties of Gas Welds in Three Alloys of Sheet Magnesium," by W. H. Jones; article in Product Engineering, September 1945. Photostat copy in 73–86.